(12) United States Patent
Rossignol

(10) Patent No.: US 10,898,916 B1
(45) Date of Patent: Jan. 26, 2021

(54) PUMP FOR COSMETIC PRODUCT VIAL PROVIDED WITH AIR PURGING MEANS

(71) Applicant: Albea Services, Gennevilliers (FR)

(72) Inventor: Eric Rossignol, Chalon sur Saone (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 16/726,583

(22) Filed: Dec. 24, 2019

(30) Foreign Application Priority Data

Dec. 24, 2018 (FR) ...................... 18 74128

(51) Int. Cl.
*B05B 11/00* (2006.01)

(52) U.S. Cl.
CPC ........ *B05B 11/3061* (2013.01); *B05B 11/304* (2013.01); *B05B 11/3033* (2013.01); *B05B 11/3028* (2013.01)

(58) Field of Classification Search
CPC ............. B05B 11/3061; B05B 11/3033; B05B 11/304; B05B 11/3028; B05B 11/3035; B05B 11/3064; B05B 11/305; F04B 9/14
See application file for complete search history.

(56) References Cited

U.S. PATENT DOCUMENTS

| | | | | |
|---|---|---|---|---|
| 3,130,877 A * | 4/1964 | Miller | ................. | B05B 11/3064 222/207 |
| 3,452,905 A * | 7/1969 | Micallef | ................. | G01F 11/08 222/207 |
| 4,088,248 A * | 5/1978 | Blake | ................. | B05B 11/3028 222/207 |
| 4,212,332 A * | 7/1980 | Kutik | ................. | B05B 11/0005 141/98 |
| 4,347,953 A * | 9/1982 | Bauer | ................. | B05B 1/083 222/207 |
| 5,046,644 A * | 9/1991 | Cater | ................. | B05B 11/3019 222/321.2 |
| 5,518,377 A | 5/1996 | Sofab | | |
| 5,979,711 A | 11/1999 | Fuchs | | |
| 6,279,784 B1 | 8/2001 | O'Neill | | |
| 10,493,475 B1 * | 12/2019 | Yang | ................. | B05B 11/00416 |
| 2004/0026458 A1 | 2/2004 | Fuchs | | |
| 2004/0265157 A1 | 12/2004 | Fuchs | | |
| 2009/0110576 A1 * | 4/2009 | Brouwer | ............. | B05B 11/3033 417/472 |
| 2010/0206910 A1 * | 8/2010 | Carta | ................. | B05B 11/3028 222/207 |

(Continued)

*Primary Examiner* — Patrick M. Buechner
(74) *Attorney, Agent, or Firm* — Steven M. Greenberg, Esq.; Shutts & Bowen LLP

(57) ABSTRACT

A pump for a vial intended to contain a cosmetic product includes a variable-volume dosing chamber defined at least partially by a deformable element. The pump operates by varying the volume of the chamber by elastic deformation of a membrane of the deformable element from an initial state wherein the chamber has a maximum volume to a deformed state wherein the volume of the chamber is minimal. The chamber is provided with a product inlet orifice and a product outlet orifice, and the pump includes deform the membrane by exerting pressure on the membrane. Finally, the pump purges the air from the chamber when the membrane is in its deformed state, by enabling the dosing chamber to communicate with the outside of the pump.

11 Claims, 8 Drawing Sheets

(56) References Cited

U.S. PATENT DOCUMENTS

| | | | |
|---|---|---|---|
| 2011/0084099 A1* | 4/2011 | Carta | B05B 11/007 222/207 |
| 2012/0024904 A1* | 2/2012 | Doulin | B05B 11/3035 222/207 |
| 2013/0336824 A1* | 12/2013 | Boes | B05B 11/3033 417/472 |
| 2014/0103071 A1* | 4/2014 | Park | B05B 11/00416 222/207 |
| 2014/0124541 A1* | 5/2014 | Mathiez | B65B 3/04 222/207 |
| 2014/0183229 A1* | 7/2014 | Van Swieten | B05B 11/3097 222/256 |
| 2014/0197207 A1* | 7/2014 | Pozzi | B05B 11/00444 222/189.09 |
| 2014/0239017 A1* | 8/2014 | Von Schuckmann | B05B 11/309 222/207 |
| 2014/0346195 A1* | 11/2014 | Doulin | B05B 11/3035 222/207 |
| 2015/0071801 A1* | 3/2015 | De Regt | F04B 45/02 417/472 |
| 2016/0158780 A1* | 6/2016 | Alluigi | B05B 11/3069 222/383.1 |
| 2016/0303601 A1* | 10/2016 | Kang | B05B 11/3025 |
| 2016/0332180 A1* | 11/2016 | Bruder | B05B 11/3053 |
| 2017/0246648 A1* | 8/2017 | Rossignol | F04B 23/028 |
| 2019/0366376 A1* | 12/2019 | Rossignol | B29C 45/0055 |
| 2020/0130002 A1* | 4/2020 | Baumann | B05B 11/0044 |

\* cited by examiner

[Fig.1]
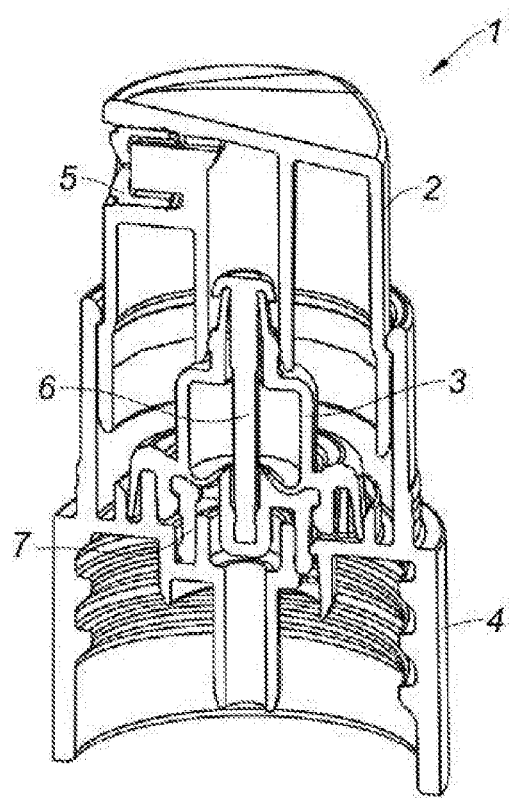

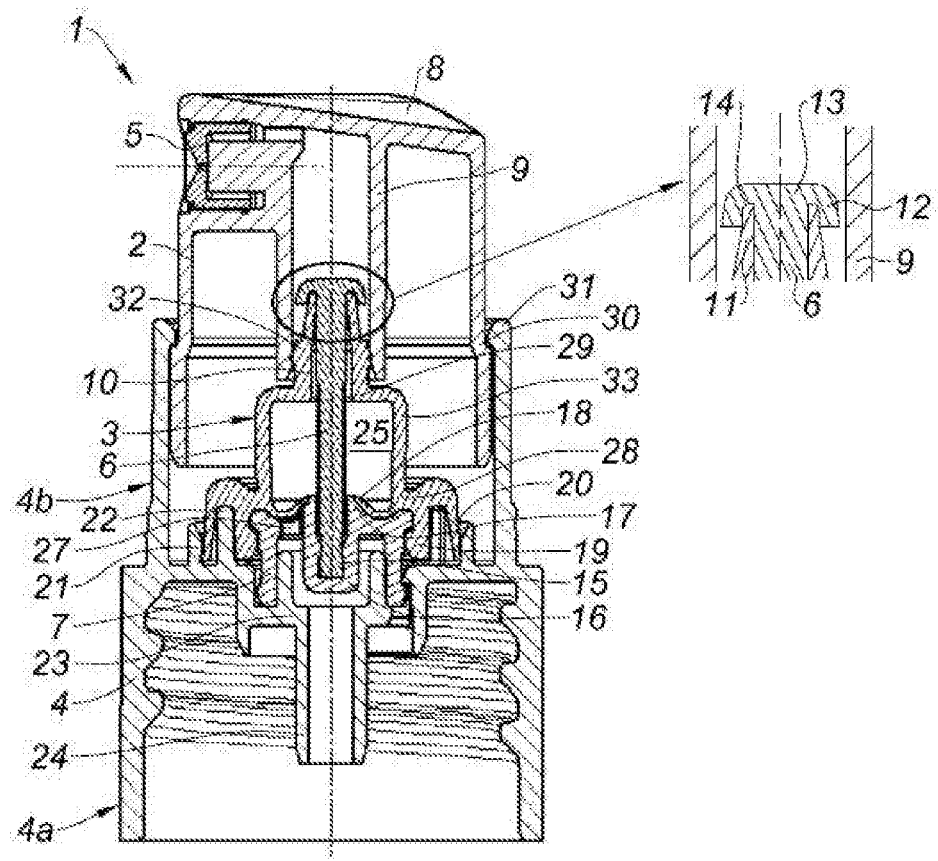
[Fig.2]

[Fig.3]
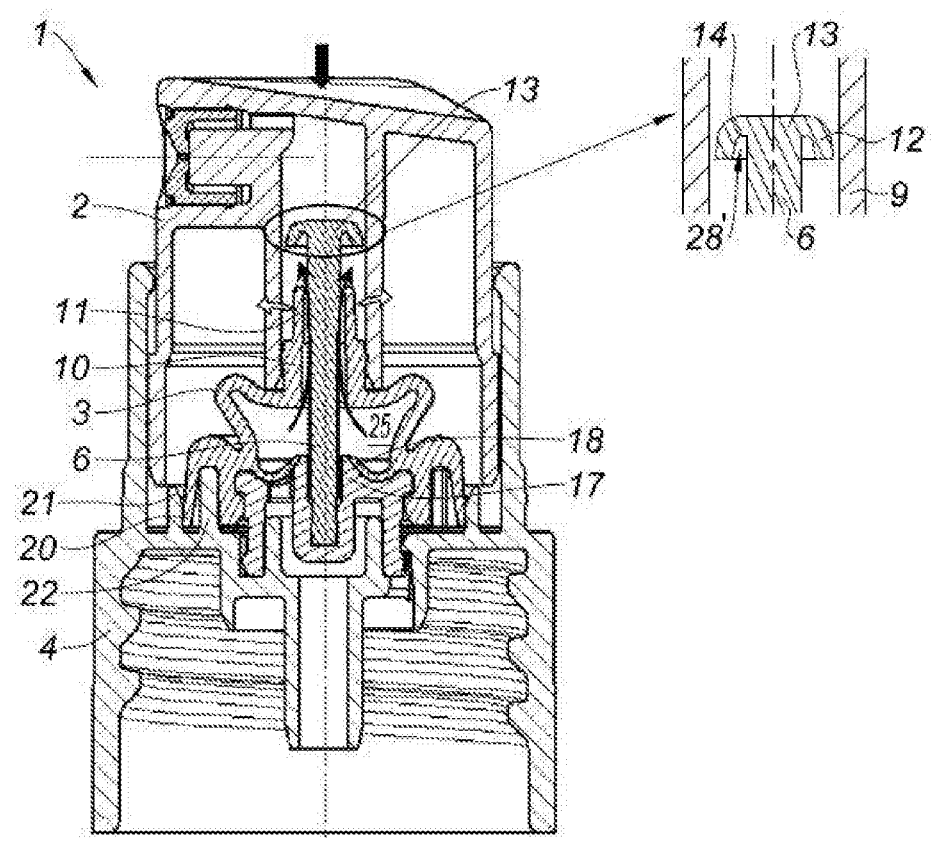

[Fig4]
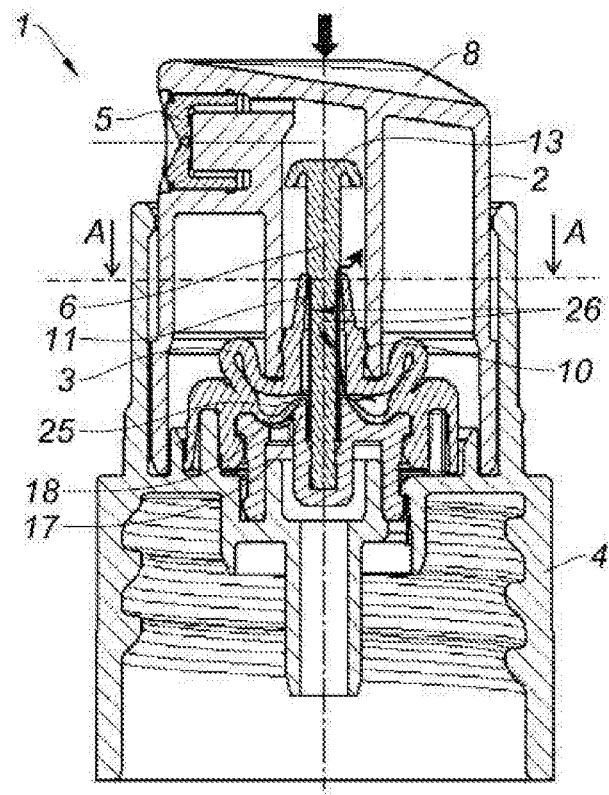
[Fig5]
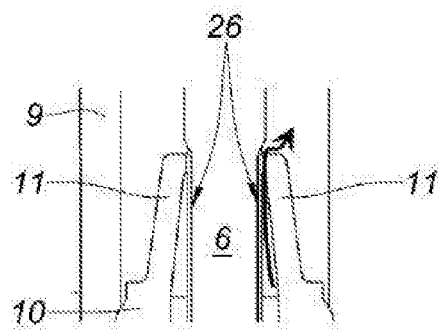
[Fig6]
Cross-section A-A
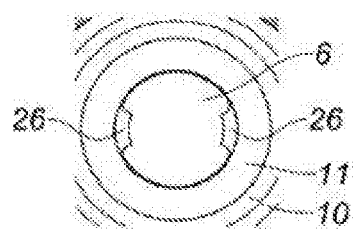

[Fig7]
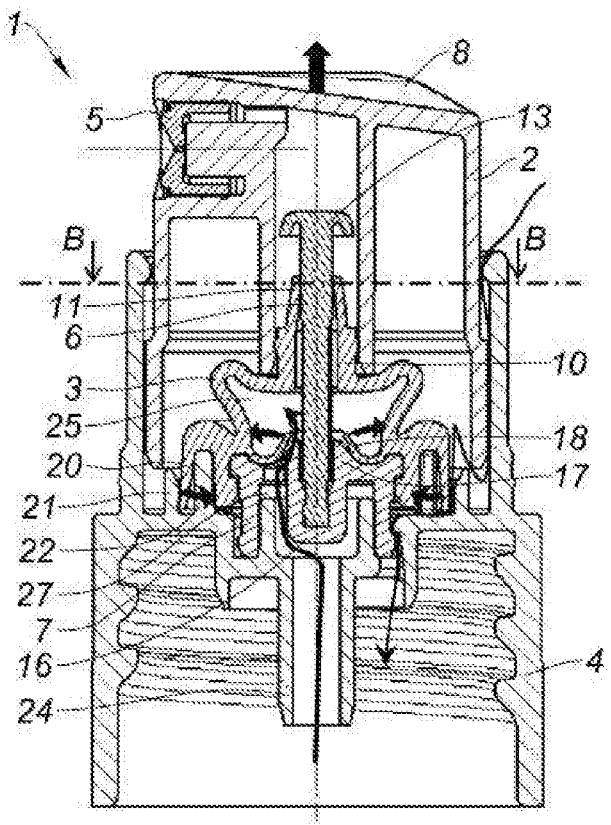
[Fig8]
Cross-section B-B
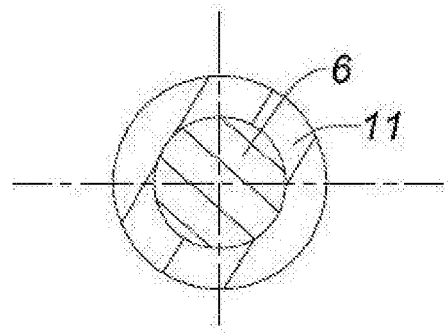

[Fig9]
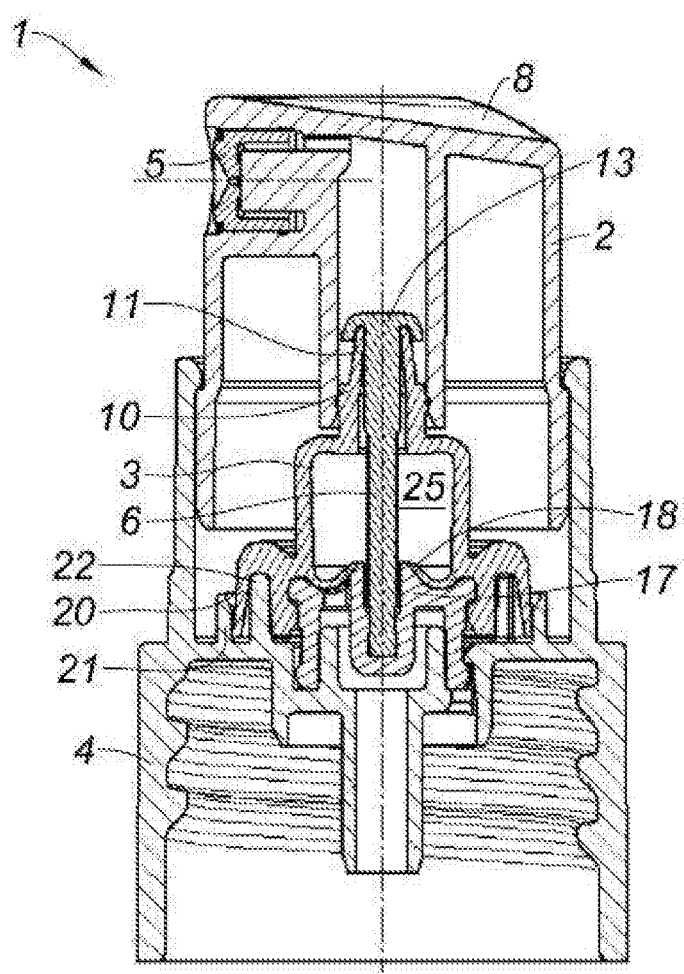

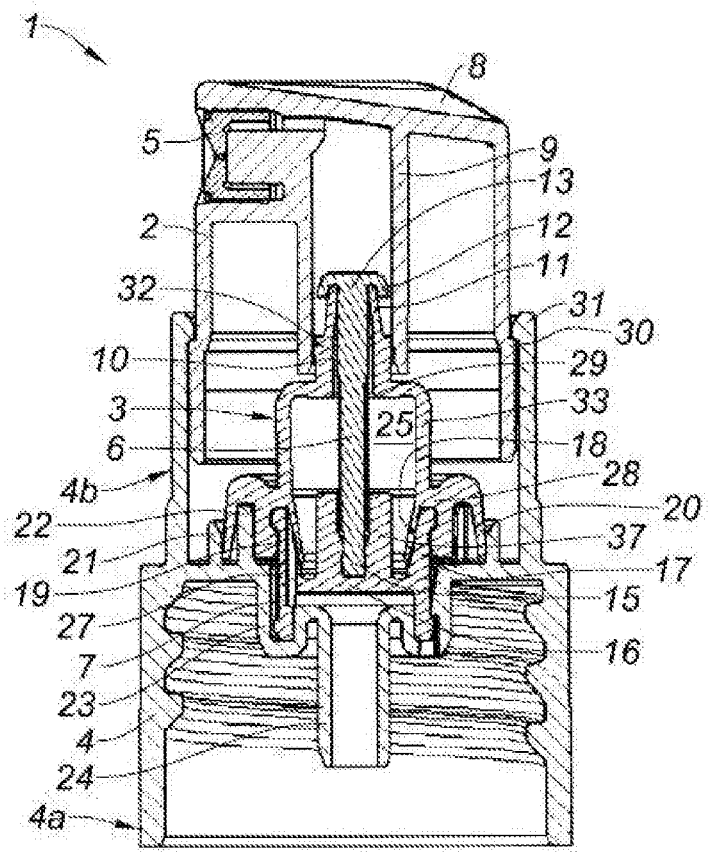
[Fig10]

[Fig11]
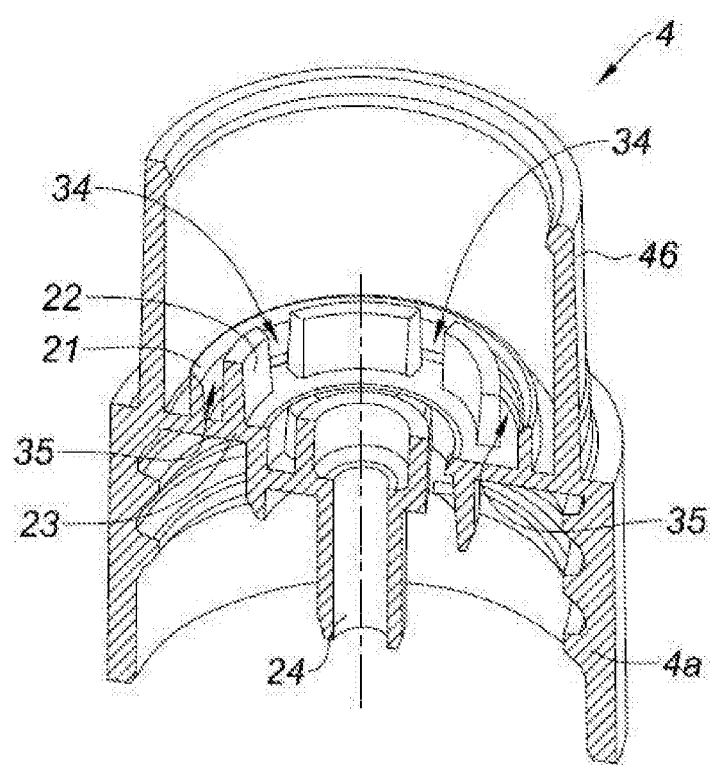

PUMP FOR COSMETIC PRODUCT VIAL PROVIDED WITH AIR PURGING MEANS

CROSS REFERENCE TO RELATED APPLICATIONS

This application claims priority under 35 U.S.C. § 119(a) to French patent application number 1874128, filed on Dec. 24, 2018, the entire teachings of which are incorporated herein by reference.

BACKGROUND OF THE INVENTION

Field of the Invention

The invention relates to a pump for a cosmetic product vial that is provided with air purging means. The invention also relates to a vial comprising such a pump.

Description of the Related Art

Some cosmetic product vials are provided with a pump configured to suction the cosmetic product contained in the reservoir of the vial for the purpose of dispensing it, for example by means of a nozzle or a simple opening. The product can therefore be extracted or sprayed from the vial to allow the application thereof. The pump is often actuated by means of a push button on which the user exerts pressure to trigger the functioning of the pump. The pump in particular comprises a dosing chamber with a volume that varies to enable the suction of the product into the chamber through an inlet orifice, when the volume increases, and its expulsion outside of the chamber through an outlet orifice, when the volume of the chamber decreases. The product exits the chamber through a dispensing duct, which transports it to the opening or the nozzle conventionally arranged on the push button.

For the dispensing of sprays, i.e. a fluid jet dispersed in the form of droplets of less than 100 µm in size, the product must be pressurised before it can be dispensed. The product is dispensed with sufficient energy for its flow to be destabilised and for the product to be dispersed in the form of droplets exiting the vial. The product can be a perfume, or a milk-type lotion of reduced viscosity.

Such pumps, i.e. pre-compression pumps, are disclosed by the prior art. The problem with these pumps is that they feature metal parts, such as springs, that are in contact with the product to be dispensed, and complicate the sorting of the components for the recycling of the pump.

The prior art therefore proposes pre-compression pumps made of an elastic membrane that limits the number of metal components, and even that eliminates them completely. Fluid product dispensers are known, said dispensers comprising such pumps with an elastic membrane, with a rod passing through the membrane at the level of an elastic annular lip. This annular lip, in contact with the rod, forms an outlet valve for the pump, the rod forming the seat of the valve. In a standby position, the actuating button is maintained in a top abutment position under the effect of the elasticity of the membrane, and the annular lip is in contact with the rod and ensures a sealed closing of the outlet valve. When the button is actuated, the volume of the dosing chamber of the pump is reduced, which increases the pressure of the fluid product inside the chamber. The outlet valve opens through deformation of the elastic lip and the product is dispensed.

Nonetheless, the prior art does not provide any information relating to the purge of the pump when air has penetrated in the dosing chamber. For "airless" dispensing systems, air can get trapped in the reservoir when the dispensing system is attached to the reservoir, which is filled with the product. For "atmospheric" systems (i.e. with air in the reservoir and an air return system), it can happened that the end of the dip tube is located outside the product, if the vial is tilted, when the pump is actuated, causing air to enter into the dosing chamber through a product inlet valve.

In a conventional dispensing pump, several actuations of the pump purges the system.

With a pre-compression pump, actuating the pump and the reduction of the volume of the dosing chamber containing air causes a compression of the air present in the chamber, without generating sufficient overpressure to cause the outlet valve to open, and compressed air therefore remains trapped inside the dosing chamber. Therefore, the pump cannot be primed.

BRIEF SUMMARY OF THE INVENTION

The present invention aims to overcome the disadvantage described above, by means of an air purging system evacuating residual compressed air from inside the dosing chamber of a pre-compression pump.

This goal is achieved with a pump for a vial intended to contain a cosmetic product, said pump comprising conventionally a dosing chamber with a variable volume defined at least partially by a deformable element, the pump functioning by causing the volume of the chamber to vary by elastic deformation of a membrane of the deformable element from an initial state in which the chamber has a maximum volume to a deformed state in which the volume of the chamber is minimal, the chamber being provided with an inlet orifice and an outlet orifice for the product, the pump comprising means to deform the membrane which is configured to exert pressure on the membrane.

This pump comprises means to purge the air from the chamber, said means being activated when the membrane is in a deformed state, said purging means enabling the dosing chamber to communicate with the outside of the pump.

The pump comprises a product outlet valve, said purging means breaking the seal of the outlet valve at the end of the actuation of the pump. The purging means therefore act directly on the functioning of the product outlet pump.

The pump comprises a guiding rod that passes through the deformable element, the deformable element sliding along the rod when the membrane undergoes said deformation, the deformable element comprising an outlet lip delimiting said outlet orifice and surrounding a section of the rod, said outlet lip coming to bear in a sealed manner against the rod, or moving away from the rod depending on the pressure inside the chamber, said outlet lip and the rod forming said outlet valve.

The main purpose of the present invention is to provide a system for purging the residual compressed air that is trapped in the dosing chamber. The system is not active when the membrane is not deformed to the maximum, i.e. when the actuating of the pump is at its maximum and a maximum of product has already left the dosing chamber. In this case only, the purging system is activated. The purging system is neutralised in all other cases, i.e. when the membrane is in standby, or when the membrane is in a transitory form, passing from one state to the other.

According to the invention, the purged air is evacuated through the product outlet orifice.

In pre-compression pumps according to the prior art, the dosing chamber communicates with the outside, without the air evacuation path intersecting with the product dispensing path. The pressure of the fluid during its dispensing is therefore not affected by the air purge. This pressure diminishes progressively at the end of the dispensing, without being cancelled out. The result is that at the end of the dispensing, the fluid is no longer dispensed in the form of a spray (insufficient pressure) and large drops can be seen falling from the outlet orifice.

In the present invention, the purged air is evacuated through the same path as that taken by the product within the pump. There is therefore a single path, taken both by the product and the purged air, at different moments. By enabling the inside of the dosing chamber to communicate with the outlet fluid circuit (outlet channel, nozzle. . . ) at the end of the dispensing to ensure the purging of air, the overpressure of the fluid is suddenly interrupted and the dispensing stops abruptly, instead of ending with large droplets. The quality of the spray at the end of the dispensing is thus improved.

A "lip" corresponds to a flexible portion, often slightly tapered, of a tab or a skirt, or of any other element, that tends to be pressed against a surface to create a seal. The lip can undergo deformation, in particular bending, so as to move away from said surface under certain conditions, for example when there is a pressure difference on either side of the lip, which has the effect of breaking the seal.

Advantageously, said purging means consist of at least one kerf or one decompression rib provided in the rod.

The term "kerf" describes a groove or a slot provided in the rod. The term "rib" is the positive equivalent of the "kerf". The rib is a protruding part of the rod, i.e. a raised portion.

This kerf or rib creates a space that is intended to be taken by the air and the fluid product simultaneously. It can feature large dimensions, facilitating its creation during the manufacturing of the rod by plastic injection. However, according to the prior art, the fluid product has to be prevented from circulating through the purging means to prevent product leakage from the body of the pump. Consequently, the purging means must be small, and therefore complicated to manufacture industrially.

Furthermore, the air to be purged, being mixed with the fluid to be dispensed, can contribute to further destabilising the flow by a blow-out effect, i.e. with product and air escaping simultaneously with a lot of power, to improve the quality of the spray at the end of the dispensing.

According to the different embodiments of the invention, that can be taken together or separately:

a) each kerf or rib extends axially along the rod.
b) each kerf or rib opens into the dosing chamber. Each kerf or rib is positioned to enable the dosing chamber to communicate with the outside of the pump when the pump is in bottom abutment position (end of the actuation).
c) each kerf or rib extends along a segment of the rod on which the outlet lip is in contact when the membrane is in its deformed state. The kerf extends along the bottom part of the rod.
d) each kerf extends along an axial length that is at least greater than the length of the outlet lip. Given that the entire length of the lip is normally pressed against the rod, the length of the kerf or the rib must be greater than the length of the lip, to ensure that an empty space is created over the entire length of the lip for the passage of residual air.
e) the membrane is dome-shaped in the initial state and the deformable element comprises a shaft arranged at the summit of the dome, the rod intersecting with the shaft so that the shaft slides along the rod during the deformation of the membrane, the outlet lip being arranged on the shaft, each kerf or rib extending on an axial length that is greater than the length of the shaft.
f) each kerf or rib extends along a segment of the rod located opposite the shaft when the membrane is in its deformed state.
g) the purging means consist of two kerfs or decompression ribs provided in the rod, diametrically opposed to one another This distribution enables to balance the air flow inside the pump.

The invention also relates to a vial, in particular for a cosmetic product, comprising a pump such as described above.

BRIEF DESCRIPTION OF THE SEVERAL VIEWS OF THE DRAWINGS

The invention is better understood, and other purposes, details, characteristics and advantages of this invention will become clearer upon reading the following detailed explanatory description of at least one embodiment of the invention, provided by way of example and not limited thereto, and with reference to the appended schematic drawings.

In these drawings:

FIG. 1 is a cross-section perspective view of the elements of a pump according to the invention, with a first product inlet valve form, FIG. 2 is a cross-section view similar to FIG. 1, in which the pump is in standby position, FIG. 3 is a cross-section view showing the start of the actuation of the pump, FIG. 4 is a cross-section view showing the pump in a position of maximum actuation, FIG. 5 is a magnified view of a portion of the guiding rod of the pump according to FIG. 4, FIG. 6 is a view of the guiding rod and of the membrane of the pump along the cross-section A-A of FIG. 4, FIG. 7 is a cross-section view showing the pump when it passes from its position of maximum actuation to its standby position, FIG. 8 is a view of the guiding rod of the membrane of the pump along the cross-section B-B of FIG. 7, FIG. 9 is a cross-section view showing the pump back in its standby position, FIG. 10 is a cross-section view of a pump according to the invention, with a second product inlet valve form, FIG. 11 is a cross-section perspective view of a sleeve of the pump according to FIGS. 1 to 9.

DETAILED DESCRIPTION OF THE INVENTION

In the following description, elements featuring identical structures or similar functions are designated by the same references.

The invention relates to a pump 1 for a vial comprising a reservoir (not shown) intended to contain a cosmetic product. As shown in FIGS. 1 and 2, the pump 1 comprises a push button 2, a deformable element 3 and a sleeve 4 serving as a shrink ring.

The purpose of the push button 2 is to enable the actuation of the pump 1 by a user. The push button 2 here has a cylindrical body provided with an opening for dispensing product in which is located a nozzle 5, and with an upper support wall 8 on which the user exerts pressure to actuate the pump 1, the push button 2 being inserted inside the sleeve 4 during actuation. Any other model of push button 2 can be used.

The pump 1 further comprises a variable-volume dosing chamber 25 defined at least partially by the deformable element 3. The pump 1 operates by varying the volume of the chamber 25 by elastic deformation of a membrane 33 of the deformable element 3 from an initial state shown in FIG. 2 in which the chamber 25 has a maximum volume and a deformed state shown in FIG. 4 in which the volume of the chamber 25 is at its minimum.

The chamber 25 has a shape that features a longitudinal axis in the initial state. The membrane 33 in this case has a rounded dome shape comprising a circular base 28 and a summit 29. The deformable element 3 further has a shaft 10 on top of the dome. The inner volume of the dome and the shaft 10 define the dosing chamber 25. The longitudinal axis of the chamber 25 passes substantially through the centre of the base 28, through the summit 29 of the dome, and through the shaft 10.

The deformable element 3 is in this case formed of a single elastic material, preferably a polymer material, for instance thermoplastic elastomer (TPE). It comprises zones of variable flexibility depending on their thickness.

The sleeve 4 is primarily constituted of an upper shrink ring 4b, a lower shrink ring 4a, and a support 23 on which the membrane 3 is positioned. In the embodiment shown here, an intermediate part 7 is secured between the deformable element 3 and the support 23 of the sleeve 4. This intermediate part 7 is snap-fitted both in the support 23 and in the deformable element 3. More specifically, the base 28 of the deformable element 3 is provided with an inner edge 19 able to be snap-fitted under a first outer edge of the intermediate part 7. In the same way, the support 23 is provided with an inner edge able to be snap-fitted under a second outer edge of the intermediate part 7. Any other attachment means can be considered. It should be noted that the support 23 and the intermediate part 7 can also be made of a single part.

The upper shrink ring 4b serves as a guiding means for the push button 2, and extends from said support 23. Indeed, the cylindrical body of the push button 2 slides inside the sleeve 4 and in particular against the peripheral wall of the upper shrink ring 4b. For safety reasons, to prevent the push button 2 from coming loose from the sleeve 4, the cylindrical body of the push button 2 is provided with a circumferential shoulder 30 able to abut against an inner edge 31 located at the free end of the peripheral wall of the upper shrink ring 4b of the sleeve 4.

From the support 23 of the sleeve 4 also extends a lower shrink ring 4a oriented towards the reservoir. The inner surface of the peripheral wall of the lower shrink ring 4a comprises a thread, for example to be screwed onto the neck of a reservoir. It is also possible to consider snap-fitting of the sleeve 4 on the neck of the reservoir. Any other attachment means can be considered.

The intermediate part 7 features a wall 17 on which the deformable element 3 rests at least partially. In particular, the deformable element 3 comprises an inlet lip 18 in the vicinity of the base 28 that rests on the wall 17. This wall 17 comprises at least one through-hole 27, enabling product to pass from the reservoir to the dosing chamber 25. This hole 27 is covered by the inlet lip 18 of the deformable element 3 when the latter is mounted on the intermediate part 7.

This inlet lip 18 is flexible and features a thinner thickness than the base 28, for increased flexibility. Thus, the inlet lip 18 is able to rise to let product into the chamber 25.

In the example shown in FIGS. 1 to 9, the wall 17 is oriented at an angle towards the inside of the sleeve 4, therefore towards the inside of the deformable element 3, and forms a truncated cone in the vicinity of the rod. The inlet lip 18 rests on the truncated cone, thereby returning back up inside the dosing chamber 25.

However, it is also possible to consider a wall 17 that is flat, or oriented differently, as is for example the case in FIG. 10. In this FIG. 10, the wall 17 is at an angle and forms a U-shaped well, limited near the axis of the pump by a wall 37 located in the vicinity of the rod, contrary to the truncated cone. The inlet hole 27 is located on an inner peripheral face of said well. The inlet lip 18 therefore covers this sloped wall 17, and covers the hole 27 that lets the product into the dosing chamber 25. The presence of the well increases the volume of the dosing chamber 25, and consequently the volume of the dispensed dose.

The support 23 of the sleeve 4 has a central conduit 24 inside or outside of which a product suction tube can be inserted and immersed inside the reservoir. The product therefore passes inside the tube and arrives in a space created between the intermediate part 7 and the support 23, and then proceeds towards the hole 27 provided in the wall 17 of the intermediate part 7. When the inlet lip 18 rises, as is detailed in the following description, the product is let into the dosing chamber 25.

The wall 17 and the inlet lip 18 form what is known as a product inlet valve. The support wall 17 serves as a seat, and the inlet lip 18 consists of a deformable admission lip able to be pressed or not against the seat, depending on the pressure inside the dosing chamber 25. When the inlet lip 18 is pressed against the wall 17, the dosing chamber 25 is sealed with respect to the reservoir containing the product.

According to the invention, the sleeve 4 is provided with a rod 6 for guiding the deformable element 3, which extends from the intermediate part 7. The rod 6 and the intermediate part 7 can be made of two different parts, or they can be made of a single part. In the embodiment shown, the rod 6 and the intermediate part 7 are two different parts. A first end 15 of the rod 6 is inserted in a central socket 16 of the intermediate part 7.

In the embodiment shown, the upper shrink ring 4b, the lower shrink ring 4a, the support 23, and the conduit 24 form a single part termed sleeve 4. The rod 6 and the intermediate part 7 could also be part of the sleeve 4 as a single part.

Conversely, an assembly of several parts could also form the sleeve 4.

a) The rod 6 is arranged substantially along a longitudinal axis of the deformable element 3, which is coaxial with the central axis of the sleeve 4 and with the central axis of the push button 2. This guiding rod 6 passes through the deformable element 3, so that the latter slides along the rod 6 when it undergoes deformation, the rod 6 passing through the chamber 25 substantially along the longitudinal axis of the chamber 25. A second end of the rod 6 is located at the level of the end of the shaft 10 of the deformable element 3. Indeed, the summit 29 of the dome and the shaft 10 form a through-channel that enables the rod 6 to pass inside said channel, and therefore through the deformable element 3. The upper end of the shaft 10 comprises a tapered part forming a flexible outlet lip 11 delimiting an outlet orifice for the fluid contained in the dosing chamber 25. This outlet lip 11 surrounds a segment of the rod 6 and is pressed against the rod 6.

The purpose of the rod 6 is to guide the membrane 33 when it passes from the initial state to the deformed state, and then from the deformed state to the initial state. The membrane 33 is thus configured to fold its summit 29 towards its base 28, the shaft 10 of the deformable element 3 also moving towards the base 28 along the rod 6. Thanks to the rod 6, the membrane 33 remains centred around the longitudinal axis of the sleeve 4. There is therefore no risk of poorly controlled folding of the membrane 33.

The outlet lip 11 and the rod 6 form what is known as a product outlet valve. The seat of this valve is constituted by the body of the rod 6, on which the outlet lip 11 is pressed. When an increase of pressure occurs inside the dosing chamber 25, the outlet valve opens by elastic deformation of the outlet lip 11 and the product can thus leave the dosing chamber 25 to arrive at the nozzle 5 from which it is dispensed. More specifically, the deformation of the outlet lip 11 generates several spaces between the rod 6 and the lip 11 through which the fluid product is able to pass and therefore exit from the dosing chamber 25.

When a loss of pressure occurs around the pump 1, for example when it is in a mountainous region or in the cargo hold of an aircraft, the pressure difference between the outside and the inside of the dosing chamber 25 increases, eventually inducing an overpressure effect, in turn causing a deformation of the outlet lip 11 and therefore a flow of product through the outlet valve, which was not what the user wanted. This overpressure phenomenon within the pump can also occur when the dispenser is left exposed to the sun.

To avoid a deformation of the outlip lip 11 when the pump 1 is in standby position, i.e. when the volume of the chamber 25 is at its maximum, the rod 6 is provided with means to support the outlet lip 11. These support means consist of the a clamping edge 12 of the outlet lip 11, extending from the second end of the rod 6. More specifically, this second end of the rod 6 is provided with a rod head 13 from which extends a clamping edge 12 that is curved in the direction of the first end 15 of the rod 6, so as to create an annual groove 28' between the body of the rod 6 and the clamping edge 12. The outlet lip 11 of the deformable element 3 can then be inserted inside this annular groove 28'. When the dosing chamber 25 has a maximum volume, the membrane 33 is deployed to the maximum and the outlet lip 11 is force-fitted into the groove 28'. The clamping edge 12 is at an angle or curved so as to exert a pressing force of the outlet lip 11 on the body of the rod 6. More specifically, the inner surce of the clamping edge 12 moves into contact with the outer surface of the outlip lip 11 to press the latter against the body of the rod 6. Thus, even in the event of a pressure drop outside the vial, the outlip lip 11 cannot be deformed as it is fully inserted and maintained inside the groove 28', under the effect of the clamping edge 12.

This clamping edge 12 extends over the entire circumference of the rod 6 so as to clamp the totality of the outlet lip 11.

Preferably, the thickness of the outlip lip 11 is great than the width of the groove 28', so that the outlet lip 11 is force fitted without reaching the bottom 14 of the groove 28'. This provides a good seal.

To deform the deformable element 3, the pump 1 comprises a deformation means arranged outside of the chamber 25 and configured to exert a pressure on the membrane 33 when the push button 2 is actuated. This deformation means is a dispensing duct 9 having an open end in contact with the membrane 33. The dispensing duct 9 is here part of the push button 2, the duct 9 extending inside the push button 2 from the inner face of the upper wall 8. The purpose of the dispensing duct 9 is to transport the fluid leaving the dosing chamber 25 to the opening and the nozzle 5 of the push button 2. The dispensing duct 9 forms a sealed contact with the deformable element 3. For this purpose, the shaft 10 is inserted in the dispensing duct 9, the duct 9 resting on the membrane 33. The shaft 10 is further provided with an outer bulge 32 that enables, on one hand, its immobilisation inside the duct 9, and on the other hand, ensures a contact seal with the dispensing duct 9. The bulge 32 is provided all around the shaft 10, here at the junction with the membrane 33, and is substantially sized to the dimensions of the open end of the dispensing duct 9.

The following is a description of the functioning of the pump 1.

In FIG. 2, the pump 1 is in a standby position. In this position, the pump 1 is sealed. Indeed, the elastic response of the pre-constrained membrane 33 tends to push the outlet lip 11 upwards and to immobilise it under the head of the rod 6, i.e. under the clamping edge 12. The outlet lip 11 is thus clamped inside the head of the rod 6. The product outlet valve is thus closed and sealed. The dosing chamber 25 has a maximum volume. The circumferential shoulder 30 of the push button 2 abuts against the inner edge 31 of the peripheral wall of the upper sink ring 4b of the sleeve 4. The inlet lip 18 of the deformable element 3 rests in a sealed manner on the wall 17 of the intermediate part 7. The product inlet valve is thus closed.

In FIG. 3 a user presses on the push button 2. The push button 2 then slides inside the sleeve 4 and moves towards the support 23 of the sleeve 4. In doing so, the push button 2 causes the shaft 10 of the deformable element 3 to move downwards towards the support 23. The outlet lip 11 slides along the rod 6 and is distant from the rod head 13. The outlet lip 11 is therefore no longer engaged with the clamping edge 12. The dispensing duct 9 of the push button 2 presses in parallel against the membrane 33 to deform it by folding it inwards. The top of the dome of the membrane 33 is thus flattened. The volume of the dosing chamber 25 thus begins to diminish and the pressure increases in the dosing chamber 25. This overpressure in the dosing chamber 25 causes the deformation of the outlet lip 11, which moves away from the rod 6 when a threshold constraint is exceeded, which is shown by the small arrows. The pressurised product in the dosing chamber 25 thus escapes through the outlet valve and penetrates in the dispensing duct 9 of the push button 2 and reaches the dispensing nozzle 5, shown by the big arrows. The dispensing of the product is therefore predicated on a minimum amount of pressure for the product to reach the nozzle 5.

At the end of the motion, as shown in FIG. 4, the cylindrical body of the push button 2 abuts against the support 23 of the sleeve 4; in the meantime, the dispensing duct 9 has deformed the membrane 33 to its maximum, and the volume of the dosing chamber 25 is at its minimum. A maximum amount of product contained in the chamber 25 leaves through the outlet valve. Since there is no more pressure in the dosing chamber 25, the outlet valve 11 is once again pressed against the body of the rod 6.

It is possible that residual air remains inside in the dosing chamber 25. This air may have been trapped in the reservoir when the dispensing system was attached to the reservoir filled with product if the pump is an airless pump, i.e. without air return, or the air could come from an air return system in the case of an atmospheric pump, i.e. with air in the reservoir, or the air can be present in the suction tube prior to first use.

In this lowered position shown in FIG. 4, the residual air is compressed in the dosing chamber 25, but without creating sufficient overpressure to open the outlet valve and to let the residual air out. A purging system has therefore been provided in the form of at least one axial decompression kerf 26 that extends along a segment of the rod 6. In this case, it is the segment on which the outlet lip 11 is in contact when the membrane 33 is compressed to the maximum, and the push button 2 abuts against the support 23 of the sleeve 4. In the example shown, there are two axial kerfs 26 diametrically opposed to one another, as shown in particular in FIGS. 5 and 6. At the level of these axial kerfs 26, the outlet lip 11 is not in contact with the body of the rod 6, in this case with the bottom of the kerf 26, and a small space is created between the outlet lip 11 and the bottom of the kerf 26, a space through which residual air can escape from the dosing chamber 25.

These axial kerfs 26 can be replaced by axial ribs. In this case, the outlet lip 11 is at a distance from the body of the rod when it passes over a rib. A space is thus created between the outlet lip 11 and the body of the rod on the right and on the left of the rib.

A single decompression kerf 26 is sufficient to enable air to escape. It is also possible to consider two, three, four, or n kerfs 26.

Each axial kerf 26 extends over an axial length that is at least greater than the length of the outlet lip 11 of the outlet valve, so that air can penetrate inside the kerf 26. It is also essential that these kerfs 26 open directly into the dosing chamber 25 at the level of the shaft 10 of the deformable element 3. It should be noted that the shaft 10 of the deformable element 3, excluding the outlet lip 11, has an inner diameter greater than the outer diameter of the rod 6. Preferably, each axial kerf 26 extends over an axial length that corresponds to the total length of the shaft 10 of the deformable element 3.

When the pump 1 is in a position of maximum actuation, the outlet lip 11 of the outlet valve surrounds the decompression kerfs 26 of the rod 6. Therefore, the seal is broken and there is a pressure drop in the chamber 25, causing the air to leave, as shown by the arrow. This can also occur during the priming of the pump 1.

In a position of maximum actuation, the dosing chamber 25, initially in a state of overpressure, communicates with the surrounding atmosphere. The pressure in the dosing chamber 25 drops, which immediately interrupts the dispensing of the product. Thus, it is possible to prevent the dispensing from ending in big drops, which is the case with conventional dispensing systems.

In FIG. 7, the user releases the pressure exerted on the push-button 2, and the latter starts rising towards its standby position, driven by the elastic response of the membrane 33. The outlet lip 11 is also pushed by the membrane 33 in the direction of the head of the rod 6. This small motion by the outlet lip 11, from a lowered position in a segment of the rod 6 with decompression kerfs 26 to an intermediate position in a smooth, round and kerf-less segment of the rod 6 generates a slight suction effect at the outlet of the nozzle 5 and prevents a drop from forming at the level of the outlet of the nozzle 5.

The rising of the membrane 33 and of the shaft 10 causes the volume of the dosing chamber 25 to increase, which in turn causes an internal loss of pressure inside the dosing chamber 25. This pressure drop, associated with the push of the product from the reservoir, causes the product inlet valve to open. In this case, the inlet lip 18 moves away from the wall 17 (as shown by the small arrows), and the product can pass from the reservoir towards the dosing chamber 25 through the hole 27 of the intermediate part 7 (as shown by the big arrow). This product suction continues until the outlet lip 11 abuts against the bottom 14 of the gorge 28 of the head of the rod 6. The outlet lip 11 is thus back in its initial position and clamped around the rod 6 by means of the clamping edge 12. In FIG. 8, it can clearly be seen that the outlet lip 11 forms a sealed contact with the rod 6. The product outlet valve is thus properly closed when the push-button 2 rises.

The deformable element 3 is provided with an air return lip 20 located in the vicinity of the base 28 and that cooperates with the support 23 of the sleeve 4. More specifically, the support 23 comprises an outer ring 21 and an inner ring 22 that surround the intermediate part 7, as is shown in FIG. 11. The inner ring 22 is interrupted so as to form passages 34. An annular gap 35 is formed between the two rings 21, 22. The air return lip 20 of the deformable element 3 is housed in this gap 35 and is able to press against the inner surface of the outer ring 21, so as to form an air return valve, the outer ring 21 then forming a seat against which the air return lip 20 is pressed in a sealed manner This lip 20 is tapered and is therefore flexible. The pressing of the air return lip 20 against the outer ring 21 creates an airtight seal between the outside of the reservoir and the inside of the reservoir.

When the push button 2 rises, the intake of the product into the dosing chamber 25 generates a pressure loss inside the reservoir containing the product, which causes the air to be suctioned through the air return valve. In particular, the suction of air will tend to move the air return lip 20 away from the outer ring 21 and to move it closer to the inner ring 22 (as shown by the small arrows). The seal is thus broken, and air can pass from the air return lip 20 to the outer ring 21, and then in the passages 34 of the inner ring 22, and then from the intermediate part 7 to the support of the sleeve 4, and ultimately to the inside of the reservoir. The air comes initially from the outside of the vial and passes from the push button 2 to the sleeve 4, before arriving at the level of the air return valve. This path is shown by a big arrow in FIG. 7.

In FIG. 9, the pump 1 has returned to its initial standby state, as seen in FIG. 2. The elastic response of the pre-constrained membrane 33 tends to push the outlet lip 11 upwards and to immobilise it under the head of the rod 6. The latter is thus clamped inside the head of the rod 6. The pressure drop is interrupted inside the dosing chamber 25, and the product inlet valve is therefore closed, as the inlet lip 18 has been pressed back against the hole 27 of the intermediate part 7 as a result of the inherent elasticity of the TPE material of the deformable element 3.

The air return lip 20 returns to its position against the outer ring 21. The air return valve is thus closed and the reservoir is airtight. The dosing chamber 25 contains a new dose of product ready to be dispensed.

The inlet lip, the outlet lip, and the air return lip are all collar-shaped as they extend peripherally in the deformable element, which is a revolution part.

The configurations shown in the mentioned figures are only some of the possible examples of the invention, which is not limited thereto, as the invention includes the variants of shapes and designs that are within the scope of the person skilled in the field.

The invention claimed is:
1. A pump for a vial intended to contain a cosmetic product, said pump comprising:
  a variable-volume dosing chamber defined at least partially by a deformable element, the pump being actuated and operating by varying the volume of the chamber by elastic deformation of a membrane of the deformable element from an initial state wherein the chamber has a maximum volume to a deformed state, wherein the volume of the chamber is minimum, the chamber being provided with a product inlet orifice and a product outlet orifice, deformation means for the membrane configured to exert a pressure on the membrane, means for purging air from the chamber that are activated when the membrane is in its deformed state, said purging means enabling the dosing chamber to communicate with the ambient exterior, a product outlet valve, said purging means breaking a seal of the outlet valve at the end of the actuation of the pump, and a guiding rod that passes through the deformable element, the deformable element sliding along the rod when the membrane undergoes said deformation, the deformable element comprising an outlet lip delimiting said outlet orifice and surrounding a segment of the rod, said outlet lip coining to bear in a sealed manner against the rod or moving away from the rod depending on the pressure in the chamber, said outlet lip and the rod forming said outlet valve.

2. The pump according to claim 1, wherein the purged air is evacuated through the product outlet orifice.

3. The pump according to claim 2, wherein said purging means consist of at least one kerf or one decompression rib provided in the rod.

4. The pump according to claim 3, wherein each kerf or rib extends axially along the rod.

5. The pump according to claim 3, wherein each kerf or rib opens into the dosing chamber.

6. The pump according to claim 3, wherein each kerf or rib extends along a segment of the rod whereon the outlet lip is in contact when the membrane is in its deformed state.

7. The pump according to claim 3, wherein each kerf or rib extends over an axial length that is at least greater than a length of the outlet lip.

8. The pump according to claim 3, wherein the membrane is dome-shaped in the initial state and the deformable element comprises a shaft arranged at the summit of the dome, the rod intersecting with the shaft so that the shaft slides along the rod during the deformation of the membrane, the outlet lip being arranged on the shaft, each kerf or rib extending on an axial length that is greater than the length of the shaft.

9. The pump according to claim 8, wherein each kerf or rib extends along a segment of the rod located opposite the shaft when the membrane is in its deformed state.

10. The pump according to claim 3, wherein the purging means consist of two decompression kerfs or ribs provided in the rod in diametrically opposed positions.

11. A vial, adapted for a cosmetic product, comprising:

a container; and a pump comprising:

a variable-volume dosing chamber defined at least partially by a deformable element, the pump being actuated and operating by varying the volume of the chamber by elastic deformation of a membrane of the deformable element from an initial state wherein the chamber has a maximum volume to a deformed state, wherein the volume of the chamber is minimum, the chamber being provided with a product inlet orifice and a product outlet orifice, deformation means for the membrane configured to exert a pressure on the membrane, means for purging the air from the chamber that are activated when the membrane is in its deformed state, said purging means enabling the dosing chamber to communicate with the ambient exterior, a product outlet valve, said purging means breaking a seal of the outlet valve at the end of the actuation of the pump, and a guiding rod that passes through the deformable element, the deformable element sliding along the rod when the membrane undergoes said deformation, the deformable element comprising an outlet lip delimiting said outlet orifice and surrounding a segment of the rod, said outlet lip coming to bear in a sealed manner against the rod or moving away from the rod depending on the pressure in the chamber, said outlet lip and the rod forming said outlet valve.

\* \* \* \* \*